(12) United States Patent
Shibasawa et al.

(10) Patent No.: US 7,004,274 B2
(45) Date of Patent: Feb. 28, 2006

(54) INSTALLATION STRUCTURE OF BATTERY UNIT

(75) Inventors: Masaru Shibasawa, Wako (JP); Tohru Ono, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 94 days.

(21) Appl. No.: 10/388,998

(22) Filed: Mar. 14, 2003

(65) Prior Publication Data

US 2003/0186115 A1    Oct. 2, 2003

(30) Foreign Application Priority Data

Mar. 29, 2002 (JP) .......................... P2002-095301

(51) Int. Cl.
  *B60R 16/04* (2006.01)
(52) U.S. Cl. .................. 180/68.5; 296/37.16; 429/100
(58) Field of Classification Search .............. 180/68.5, 180/65.1, 65.2, 65.3, 291, 68.1; 296/37.16, 296/37.1; 280/781, 783; 429/100; B60R 16/04
See application file for complete search history.

(56) References Cited

U.S. PATENT DOCUMENTS

| | | | | |
|---|---|---|---|---|
| 1,552,320 | A * | 9/1925 | Lea ........................... | 180/68.5 |
| 4,616,872 | A * | 10/1986 | Akira et al. ............ | 296/190.11 |
| 5,633,095 | A * | 5/1997 | Ishikawa et al. ............... | 429/1 |
| 5,836,412 | A * | 11/1998 | Lyles et al. ................ | 180/65.1 |
| 6,016,882 | A * | 1/2000 | Ishikawa ................... | 180/205 |
| 6,220,383 | B1 * | 4/2001 | Muraki et al. ............. | 180/68.5 |
| 6,257,360 | B1 * | 7/2001 | Wozniak et al. ........... | 180/69.5 |
| 6,276,479 | B1 * | 8/2001 | Suzuki et al. ............... | 180/207 |
| 6,541,151 | B1 * | 4/2003 | Minamiura et al. ........... | 429/98 |
| 6,669,505 | B1 * | 12/2003 | Wisniewski ................. | 439/521 |
| 6,736,229 | B1 * | 5/2004 | Amori et al. .............. | 180/68.5 |
| 2002/0157886 | A1 * | 10/2002 | Iwase ........................ | 180/68.5 |
| 2003/0089540 | A1 * | 5/2003 | Koike et al. ............... | 180/68.5 |
| 2003/0098191 | A1 * | 5/2003 | Takedomi et al. ......... | 180/68.5 |

FOREIGN PATENT DOCUMENTS

| | | | |
|---|---|---|---|
| EP | 1034956 | A2 * | 9/2000 |
| FR | 2690392 | A1 * | 10/1993 |
| JP | 57-172969 | | 5/1984 |
| JP | 62-053261 | | 3/1987 |
| JP | 10053028 | A * | 2/1998 |
| JP | 10-255746 | | 9/1998 |
| JP | 10255746 | A * | 9/1998 |
| JP | 2000-108787 | | 4/2000 |
| JP | 2000-255276 | | 9/2000 |
| JP | 2001-328439 | | 11/2001 |
| JP | 2003-146008 | | 5/2003 |

* cited by examiner

*Primary Examiner*—Christopher P. Ellis
*Assistant Examiner*—Kelly E. Campbell
(74) *Attorney, Agent, or Firm*—Hamre, Schumann, Mueller & Larson, P.C.

(57) ABSTRACT

An installation structure allowing installation of a capacitor as a battery unit in a hybrid vehicle, even in a vehicle not having a luggage compartment, is provided. A rear pillar cross member is mounted behind the rear seat in the cross section of the vehicle, and both ends of the rear pillar cross member are joined to inner panels of a wheel housing through a bracket and a reinforcing bracket plate. A top portion of the capacitor, which is a battery unit, is fixed to the rear pillar cross member, and the bottom portion of the capacitor is joined to the floor cross member, such that the capacitor is installed in a standing state. In addition, a setting structure for reliably setting a rear seat body on the floor of the vehicle is also provided.

1 Claim, 7 Drawing Sheets

INSTALLATION STRUCTURE OF BATTERY UNIT

BACKGROUND OF THE INVENTION

1. Field of the Invention

The present invention relates to an installation structure of a battery unit enabling installation of a battery unit even in a vehicle, such as a three door-type vehicle, which has no luggage compartment. The present invention also relates to a setting structure of a seat for setting the rear seat to the floor of the vehicle without making a hole through the floor of the vehicle body.

2. Description of the Related Art

Conventional hybrid vehicles use a battery unit as an auxiliary driving power source in addition to a main driving power source. Since the battery unit used in a hybrid vehicle requires installation space, it is normally installed in the luggage compartment of the vehicle.

When the hybrid vehicle is provided with a luggage compartment, a part of the luggage compartment may be used for the battery unit. However, in three door-type hybrid vehicles, not provided with a luggage compartment, there is insufficient space for installing the battery unit. In addition, the portion of the vehicle body where the battery unit is installed is required to have a considerable degree of rigidity for supporting the battery unit, which is normally relatively heavy.

The present invention provides an installation structure of the battery unit even in a vehicle in which a luggage compartment is not provided.

The present invention also provides a setting structure of a seat for setting the rear seat to the floor of the vehicle without making a hole through the floor of the vehicle body so that the setting structure of the present invention is capable of preventing leakage of the gas through the vehicle body.

SUMMARY OF THE INVENTION

In order to solve the above problems, one embodiment of the present invention provides an installation structure for a capacitor as a battery unit providing auxiliary power for a fuel cell in a hybrid vehicle, even in a vehicle having no luggage compartment, in a standing state, the installation structure comprising a rear pillar cross member mounted behind a rear seat in the transverse direction of the vehicle and both ends of which are connected to inner panels and damper bases of wheel housing through respective brackets and reinforcing bracket plates, a floor cross member mounted on the upper surface of the rear floor of the vehicle in the transverse direction of the vehicle body wherein the top portion of said capacitor is joined to said rear pillar cross member and the bottom portion of said battery unit is joined to said floor cross member.

The above installation structure of the battery unit rigidly fixes the capacitor as the battery unit behind the rear seat in a standing state, leaving space for loading luggage since the top portion of the battery unit is supported by the inner panels of the wheel housing through the rear pillar cross member and the brackets, and the bottom portion of the battery unit is supported by the rear floor through the floor cross member. In addition, use of the inner panels serves to support the capacitor rigidly by distributing the load of the battery unit to inner panels on both sides, using the rear pillar cross member as a framework to connect both inner panels.

According to another embodiment of the present invention, a setting structure for a rear seat for reliably setting the rear seat on a rear floor without forming fitting holes through the rear floor of a hybrid vehicle, provided with a hydrogen tank under the rear floor, the installation structure comprising a floor front cross member mounted in the transverse direction of the vehicle on a front upper surface of the rear floor, comprising a setting seat for setting a front bottom of the rear seat and a front fixing hole, a floor rear cross member mounted in a transverse direction of the vehicle on a rear upper surface of a rear floor comprising a rear fixing hole, a rear seat body composing a step portion disposed at the front side bottom and a front fixing hole and a rear fixing hole for fixing the backside of the rear seat body, wherein the front side of the rear seat body is joined by engaging the step portion with backside of the front cross member and by fixing through the front fixing hole, and the rear bottom of the rear seat body is fixed with the backside of the floor rear cross member through the rear fixing hole.

The above setting structure for setting the rear seat by use of joining tools to these cross members, which are connected to the floor, makes it possible not to bore holes through the floor of the vehicle so that such setting prevents leakage of gas through the floor into the vehicle compartment. Moreover, since the cross members function as the members to stop the shift of the seat by engaging the bottom portion at the front side of the rear seat with the back wall of the front cross member, the above setting structure is quite stable against the forward load applied to the vehicle body when the vehicle is suddenly stopped.

According to the third aspect of the present invention, in an installation structure of the battery unit according to the first aspect, the bracket is connected to a damper base (for example, damper base 41 in the embodiment) of the wheel housing.

The above installation structure of the battery unit according to the third aspect of the present invention utilizes the increased rigidity of the damper base.

DETAILED DESCRIPTION OF THE INVENTION

One embodiment of the present invention is described below with reference to the attached drawings. The hybrid vehicle according to the present embodiment comprises a fuel cell (not shown) and a capacitor (battery unit) as an auxiliary electric source.

Figure 1:
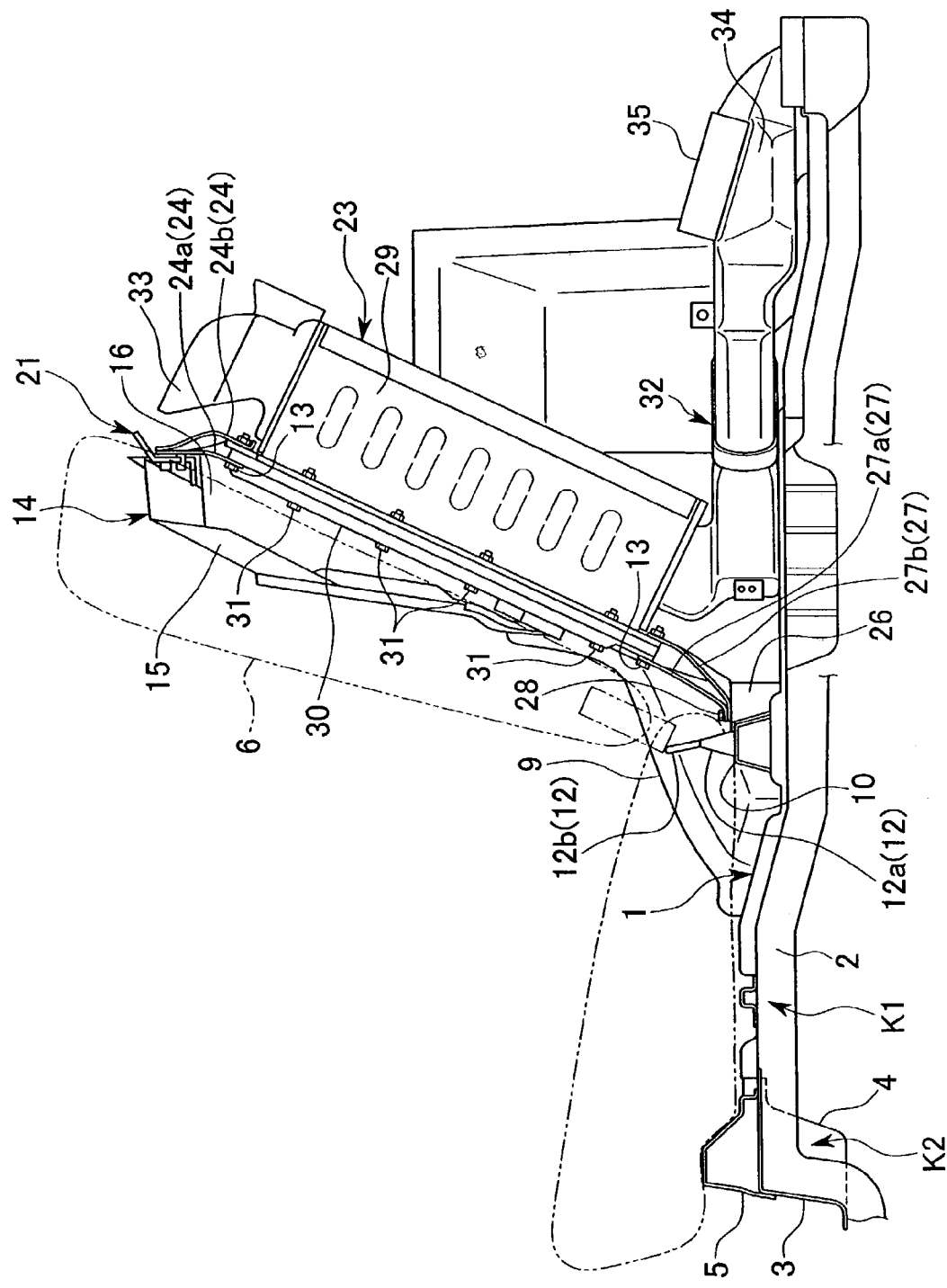
FIG. 1 is a side view of the installation structure of the battery unit explaining the present invention.
Figure 2:
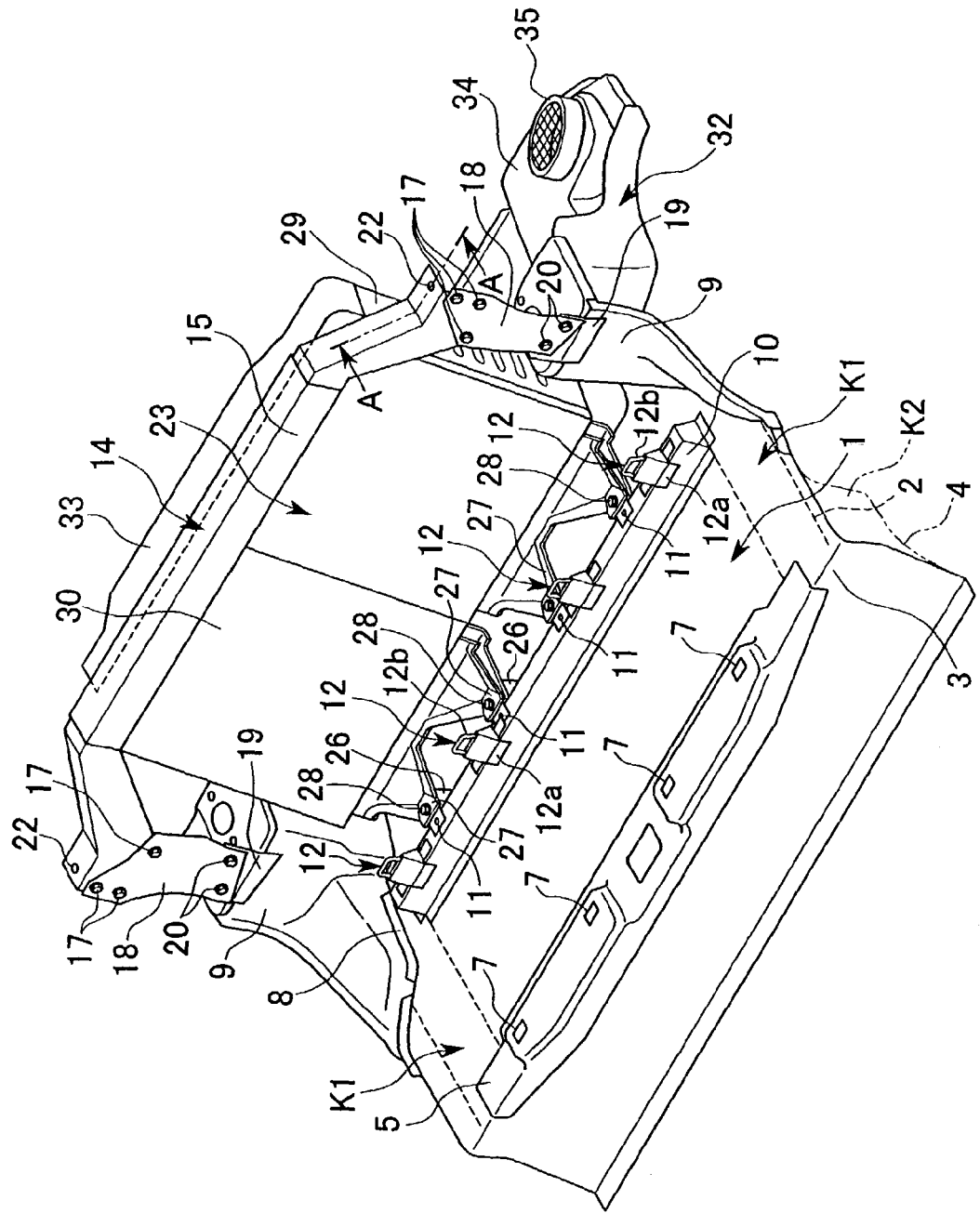
FIG. 2 is a perspective diagram showing the front view of the installation structure of the battery unit of the present invention.
Figure 3:
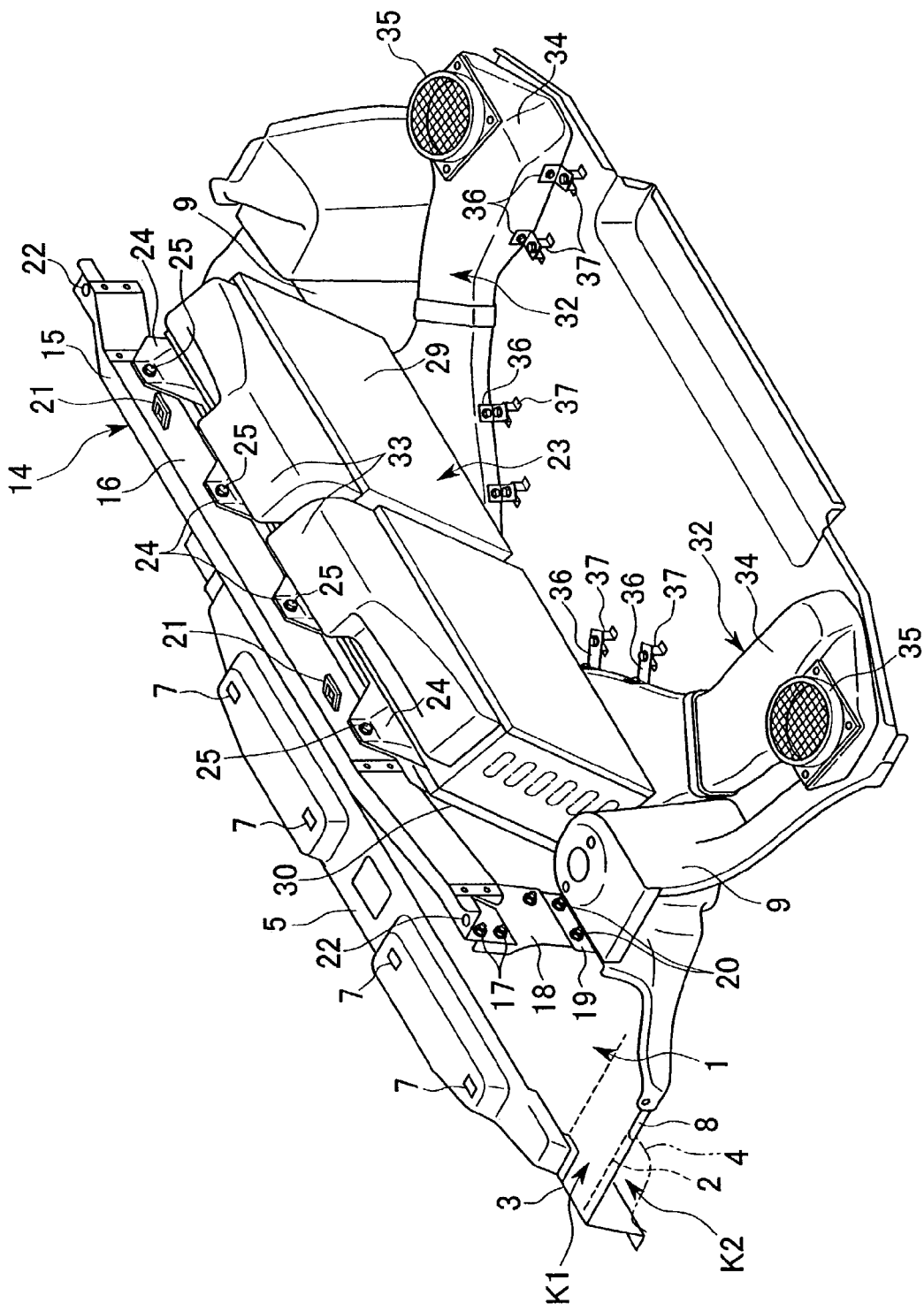
FIG. 3 is a perspective diagram showing the rear view of the installation structure of the battery unit of the present invention.

As shown in FIGS. 1 to 3, a front side of a rear floor 1 is formed to slope downwards in a stepwise manner. The leading edge of the rear floor 1 is joined to the trailing edge of the floor panel (not shown). The rear frame 2 is joined to the under surface of both side portions of the rear floor 1, and the cross-sectional structural portion enclosed by the rear frame 2 and the rear floor 1 forms a framework K1 of the vehicle body.

A cross member 4, having an L-shaped cross-section, is joined upside of the rear frame 2 in the transverse direction of the vehicle to the rear surface of the step portion 3 in front of the rear floor 1, and the cross-sectional structural portion enclosed by the cross member 4 and the rear floor 1 forms a framework K2 of the vehicle body.

A reinforcing member 5, which has an L shaped cross-section and which is formed by a plate thicker than the rear floor 1, is joined by welding to the step portion 3 extending in the vehicle transverse direction upside of the rear frames 2. The cross member 4 is reinforced by the reinforcing member 5. A pair of two front fitting holes for fitting the front side of the rear seat 6 is provided on the upper surface of the reinforcing member 5.

As shown in FIGS. 2 and 3, inner panels 9 of the wheel housing are joined, respectively, to flange portions 8 mounted on both sides of the rear floor 1, and inner panels 9 together with outer panels (not shown) form wheel housings.

On the upper surface of the rear floor 1, a floor cross member 10 having a U-shaped cross section is provided behind the reinforcing member 5 and in front of the inner panel 9 of the wheel housing, extending in the vehicle transverse direction upside of the installation position of the rear frame 2. The floor cross member is formed to have a closed cross-section so as to provide advantageous structural strength to this member. On the upper surface of the floor cross member 10, back mounting holes 11 for mounting the rear seat 6 are formed at positions corresponding to the front mounting holes 11.

As shown in FIG. 1, a rear seat 6, which is shown by dotted lines, is fixed to the front mounting holes 7 of the rear seat 6 provided on the reinforcing member 5 and to the back mounting holes 11 of the rear seat 6 provided on the floor cross member 10. Two lower anchors 12 for fixing child seats (not shown) are provided on the floor cross member 10. Note that each lower anchor 12 comprises an anchor bracket 12a to be joined to the floor cross member 10 and a ring member 12b.

A rear pillar cross member 14, having a closed cross-section, is provided behind the rear seat 6. This pillar cross member 14 is formed by jointing a front side member 15 and a rear side member 16, both of which have L-shaped cross-sections with both ends of the pillar member formed so as to be inclined downward. Note that, as shown in FIG. 3, behind the rear pillar cross member 14, upper anchors 21 and 21 are provided for fixing the child seat corresponding to the lower anchors 12 and 12.

Figure 4:
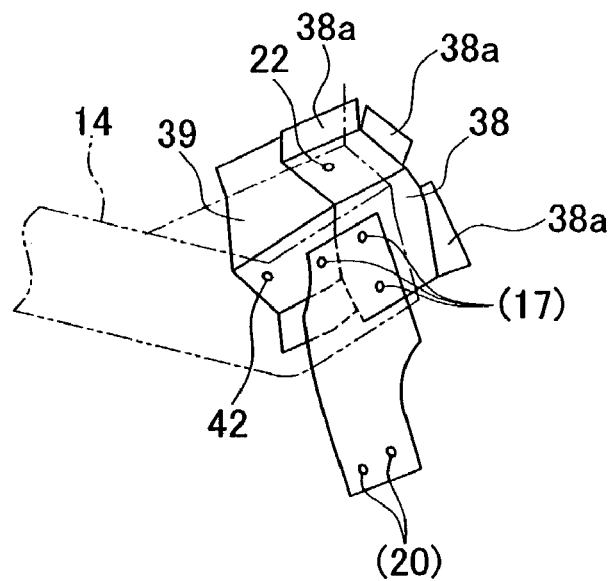
FIG. 4 is a perspective diagram of the main portion of the installation structure of the battery unit shown in FIG. 2.
Figure 5:
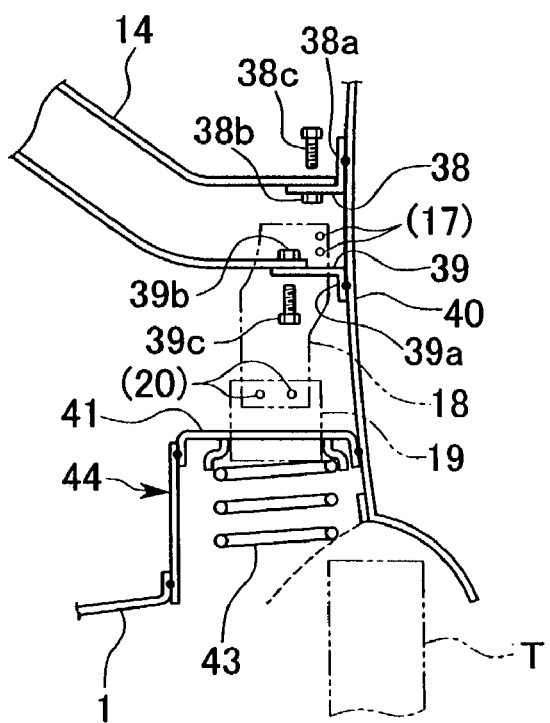
FIG. 5 is a cross-sectional diagram of the installation structure of the battery unit along A—A line of FIG. 2.

Each end of rear pillar cross member 14 is joined to an inner panel 40 of a rear fender by being supported through an upper support 38 and lower support 39, which are shown in FIGS. 4 and 5 described in a later section. The upper portion of the bracket 18 is fixed by bolts 17 to each edge portion of the rear pillar cross member 14 shrouding the upper support 38 and lower support 39, and the lower portion of the bracket 18 is fixed to the damper base 41 of the wheel housing by bolts 20 through the reinforcing bracket plate 19.

Assembling the rear pillar cross member 14, inner panel 40 of the rear fender, and the damper base 41 of the wheel housing is described below in practical terms with reference to FIGS. 4 and 5.

As shown in FIGS. 4 and 5, the upper support 38 and the lower support 39 are located at the end of the rear pillar cross member. The outside of the upper support 38 is bent to form a flange portion 38a, and this flange portion 38a is used for jointing by welding to the inner panel 40 of the rear fender. A flange 39a is also formed at the outside of the lower support 39 and the flange 39a of the lower support is used for joining by welding to the inner panel of the rear fender.

In addition, the rear pillar cross member 14 and the upper support 38 are connected by fastening the bolt 38c, inserted through the fitting hole 22 located at the end of the rear pillar cross member 14, by a weld nut 38b mounted at the rear surface of the upper support 38. The rear pillar cross member 14 and the lower support 39 are also connected by fastening the bolt 39c, inserted through the fitting hole 42 located at the end of the rear pillar cross member 14, by a weld nut 39b mounted at the front surface of the lower support 38.

As shown in FIG. 5, a spring 43 for suspension is received in the inner panel 40 of the rear fender, a strut housing portion 44 connected to the rear floor 1 is formed, and the upper wall of the strut housing portion 44 forms the damper base 41. Note that the damper base 41 also constitutes a part of the inner panel 9 of the wheel housing.

The upper portion of the bracket 18 is fixed by bolts 17 to the end portion of the rear pillar cross member 14 shrouding the upper support 38. A reinforcing bracket plate 19 is mounted on the lower portion of the bracket 18 by bolts 20, and the reinforcing bracket plate 19 is connected and fixed to the damper base 41 of the wheel housing. Note that bolts 17 and 20 in FIGS. 4 and 5 indicate mounting locations of these bolts so that these numbers are enclosed in parentheses. In addition, T in FIG. 5 indicates a tire of the vehicle.

The upper portion of the capacitor 23 is fixed to the rear surface of the rear pillar cross member 14 by fixing the upper fitting portions 24 of the capacitor by use of bolts 25, and the lower portion of the capacitor is fixed on a pedestal 26, connected with the backside of the floor cross member 10 and mounted on the rear floor 1, by fixing the lower fitting portions 27 with bolts 28, so that the capacitor 23 is thereby installed by the obliquely standing state inclining the upper potion of the capacitor in the backward direction. Thus, the capacitor 23 is placed behind the rear seat 6 so that the rear seat conceals the capacitor 23.

The capacitor 23 is used for assisting the fuel cell by supplying auxiliary power when starting or accelerating using electrical energy that is stored in the capacitor 23 at the time of regenerative braking.

A rear side case 29 that houses the capacitor body (not shown) and the electrical equipment for the capacitor 23 and the front cover 30 that encapsulates the rear side case 29 are integrated with bolts to thereby form the capacitor 23. The upper fitting portion 24 of the capacitor 23 comprises a fitting piece 24a of the rear side case 29 and a fitting piece 24b of the front cover 30. Similarly, the lower fitting portion 27 comprises a fitting piece 27a of the rear side case 29 and the fitting piece 27b of the front case 30. Note that the fitting pieces 27a and 27b are attached to the case 29 and the cover 30 by bolts 13.

A suction portion 33 of a cooling wind duct 32 connected to the case 29 is provided above the capacitor 23. On the other hand, below the capacitor 23, an exhaust portion 34 of the duct 32 connected to the case 29 extends towards right, left, forward and backward directions. An exhaust port 35, which opens upward, is provided together with a circulation fan at the end portion of the exhaust portion 34 for cooling the capacitor by circulating air through the duct 32 by circulating air. Note that the bracket 36 provided for setting the duct 32 is fixed to the bracket 37 provided at the rear floor 1 and the duct 32 is fixed to the rear floor 1.

According to the above described embodiment, since the capacitor 23 can be supported by the floor cross member 10, the rear pillar cross member 14, bracket 18, and the reinforcing bracket plate 19, it is possible to reliably support the heavy and bulky capacitor 23, even in the three door vehicle having no luggage compartment. In the present embodiment, since the capacitor 23 is installed behind the rear seat 6, the capacitor 23 can be installed without sacrificing space of the compartment to ensure the luggage storage space at the rear portion and without affecting the exterior appearance of the vehicle.

Practically speaking, at the lower side of the capacitor 23, the load of the capacitor 23 is transmitted through the four lower fitting portions 27 and the pedestal 26 to the floor cross member 10, which is formed into a structure with a closed cross-section having advantageous strength, and the load is transferred from the floor cross member 10 and is distributed and supported by both left and right rear frames 2, which form the framework K1 of the vehicle body.

Since the load of the capacitor 23 applied to the floor cross member 10 is also transmitted through the rear seat 6 to the frontward reinforcing member 5, the capacitor is also supported by the framework K2, which is formed by the cross member 4 under the reinforcing member 5 and the rear floor 1. As a result, mainly the frameworks K1 and K2 extending in the longitudinal direction of the vehicle as well as the entire rear floor 1 support the load of the capacitor 23 so that quite reliable support of the capacitor 23 can be realized.

The load of the upper portion of the capacitor 23 is transmitted through the four upper fitting portions 24 to the rear pillar cross member 14, and the load is transferred from both ends of the rear pillar cross member 14 through the bracket 18 and reinforcing bracket plate 14 to the inner panel 9 of the wheel housing, and the load is distributed and finally supported by the rear floor 1 and the rear frame 2, which forms the framework K1 of the vehicle body. Furthermore, the load applied to the rear pillar cross member 14 is transmitted through the upper support 38 and the lower support 39 to the inner panel 40 of the rear fender panel so that the capacitor 23 can be reliably supported.

Consequently, it is possible to increase the rigidity of the vehicle body by having the rear pillar cross member 14 function as the framework connecting the inner panels 40 of both right and left rear fenders, which form the side walls of the vehicle body, and therefore, the capacitor 23 is reliably supported by the inner panel by sharing the load with both inner panels 40.

Since provision of the reinforcing bracket plate 19 and the bracket 18 enables an increase in the supporting rigidity of the damper base 41, the spring force of the spring 43 used in the strut housing can be reduced by an amount corresponding to the increased amount of the supporting rigidity allowing the driver a more comfortable driving experience.

Since the frameworks K1 and K2 of the vehicle body reliably support the capacitor 23 located behind the rear seat 6, the capacitor 23 can be situated in a vehicle having no luggage compartment while ensuring a high supporting rigidity.

Note that the present invention is not limited to the above-described embodiment, and the present invention can be applied not only to installation of the capacitor but also to installation of a battery. Furthermore, the floor cross member 10 can be favorably used as a mounting base for mounting a seat belt.

As described above, according to the first aspect of the invention, since the battery unit can be reliably supported in a vehicle body behind the rear seat while the load of the battery is distributed on the vehicle body, the battery unit can be reliably installed even in a vehicle having no luggage compartment.

According to the above installation structure, a comparatively large battery unit can be installed even in the vehicle having no luggage compartment by use of a rear pillar cross member, a floor cross member, and a bracket, without sacrificing the inside space of the vehicle and the space for storing luggage.

In the above construction, an effect of the present invention is obtained that the floor member can be used for a mounting member for mounting seats, seat belts, and child seat anchors.

According to the second aspect of the present invention, the functional use of the rear pillar cross member as the skeletal structure connecting the left and right inner panels, which constitute both side walls of the vehicle body, makes it possible to reinforce the vehicle body and to reliably support the battery unit while distributing the load of the battery unit to the inner panels.

According to the third aspect of the present invention, the bracket can improve the rigidity of the damper base for supporting the battery unit, so that the force of the spring can be reduced by an amount corresponding to the improved rigidity of the damper base, which results in improving driving comfort.

Hereinafter, "an installation structure of a seat", which is disclosed in Japanese Patent Application No. 2002-101638 entitled "an installation structure of seat" filed on Apr. 3, 2002 is incorporated in the present specification as described below with reference to the above installation structure of the battery unit.

Figure 7:
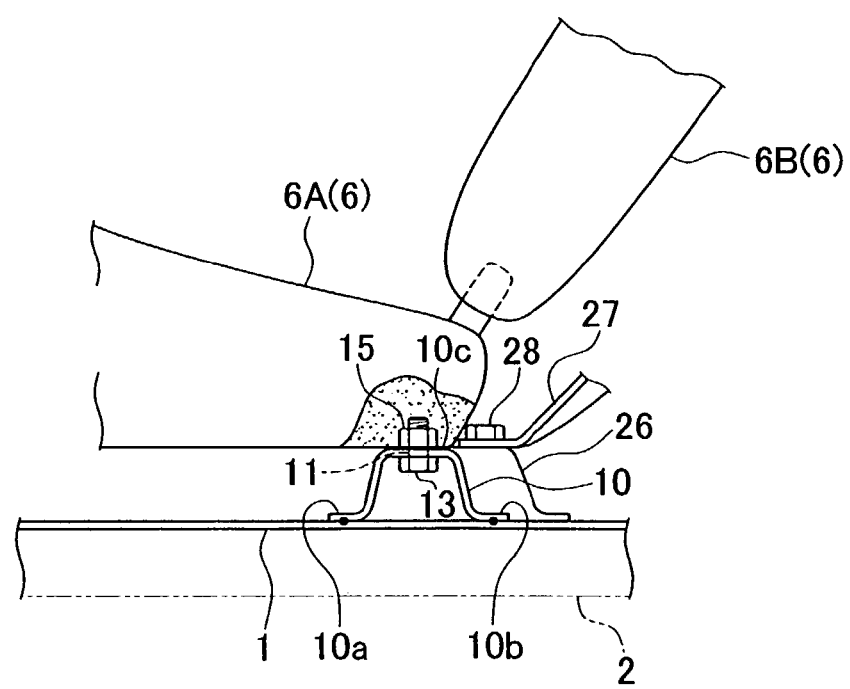
FIG. 7 is a cross-sectional diagram of a seat fitting structure along B—B line of FIG. 9.
Figure 8:
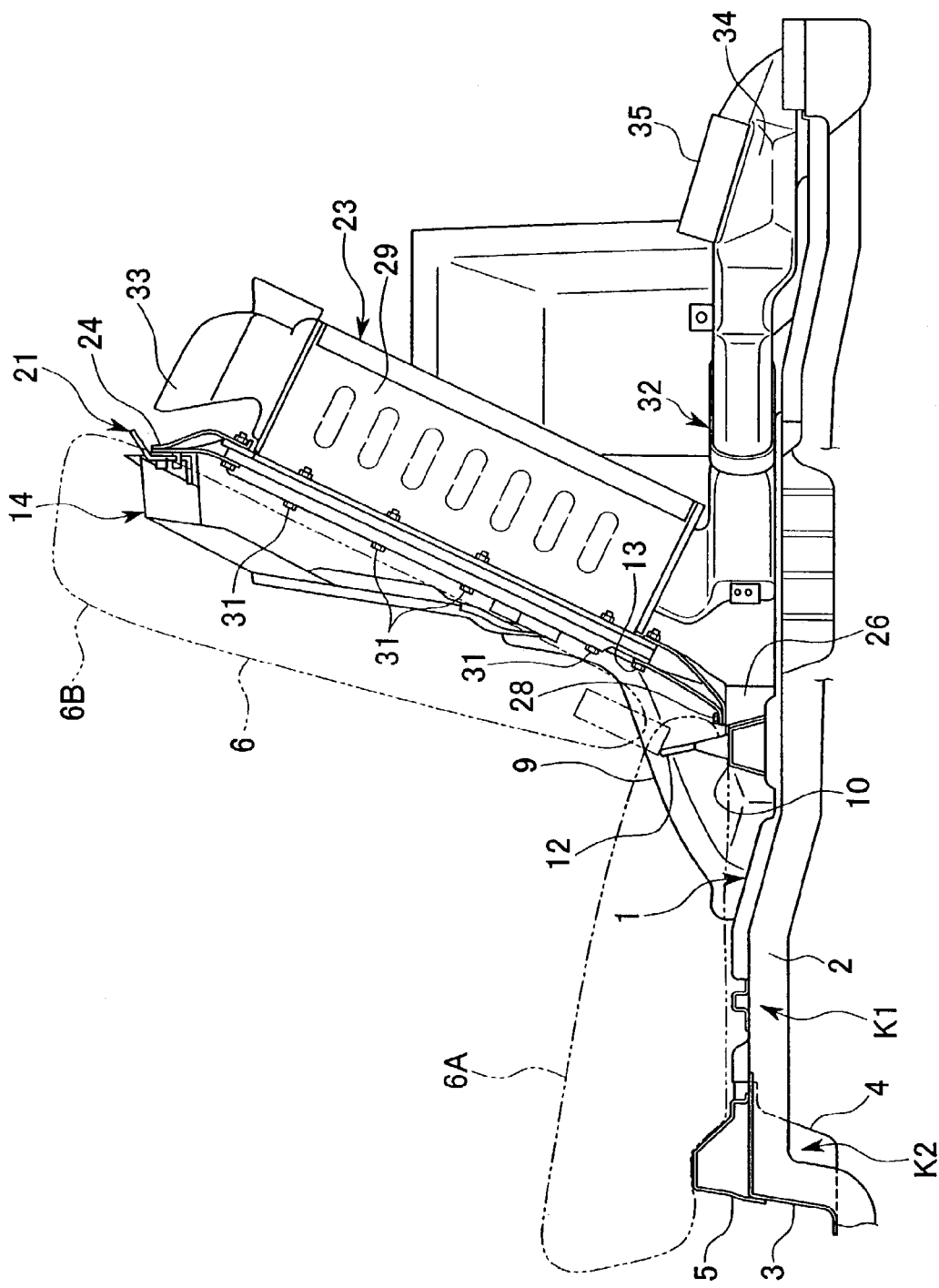
FIG. 8 is a side view diagram showing the seat fitting structure of the present invention.

The hybrid vehicle of the present invention comprises a fuel cell (not shown) and the capacitor (battery unit), as described above. As shown in FIGS. 7 and 8, the cross-sectional structural portion surrounded by the rear floor 1 and the rear frame 2 constitutes the first framework of the vehicle body K1 and the cross-sectional structural portion surrounded by the rear floor 1 and the cross member 4 constitutes the second framework K2.

Figure 6:
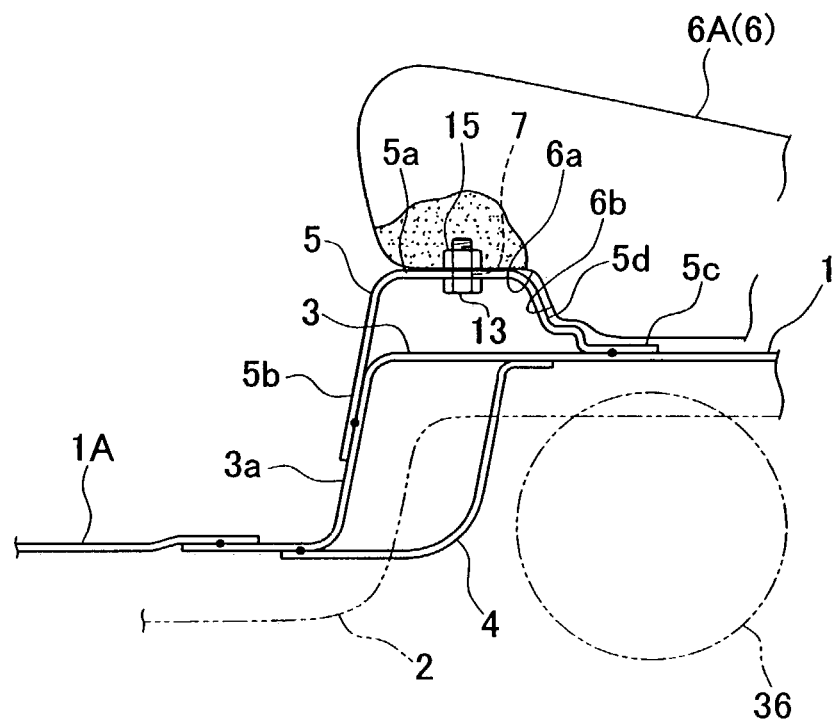
FIG. 6 is a cross-sectional diagram of a seat fitting structure along C—C line of FIG. 9.

As shown in FIGS. 6 and 7, at the step portion 3, a reinforcing member 5, which has an L-shaped cross-section and is made of a plate material thicker than that of the rear floor, is provided in the transverse direction of the vehicle above the setting portions of the rear frame 2 and the reinforcing member 5 is connected to the rear floor 1 by welding.

On the upper surface of the floor front cross member 10, an upwardly inflated setting seat (upper base) 5a is provided for setting a seat body 6A of the seat 6, comprising a seat body 6A and a seat back 6B and two pairs of front fixing holes 2 for fastening the seat.

As shown in FIG. 6 in detail, the floor front cross member 5 comprises a front wall portion 5b to be welded to the vertical wall 3a of the step portion 3, and a back flange portion 5c, to be welded on the upper surface of the rear floor, so that the floor front cross member 5 constitutes a structure with a closed cross-section on the rear floor 1.

Figure 9:
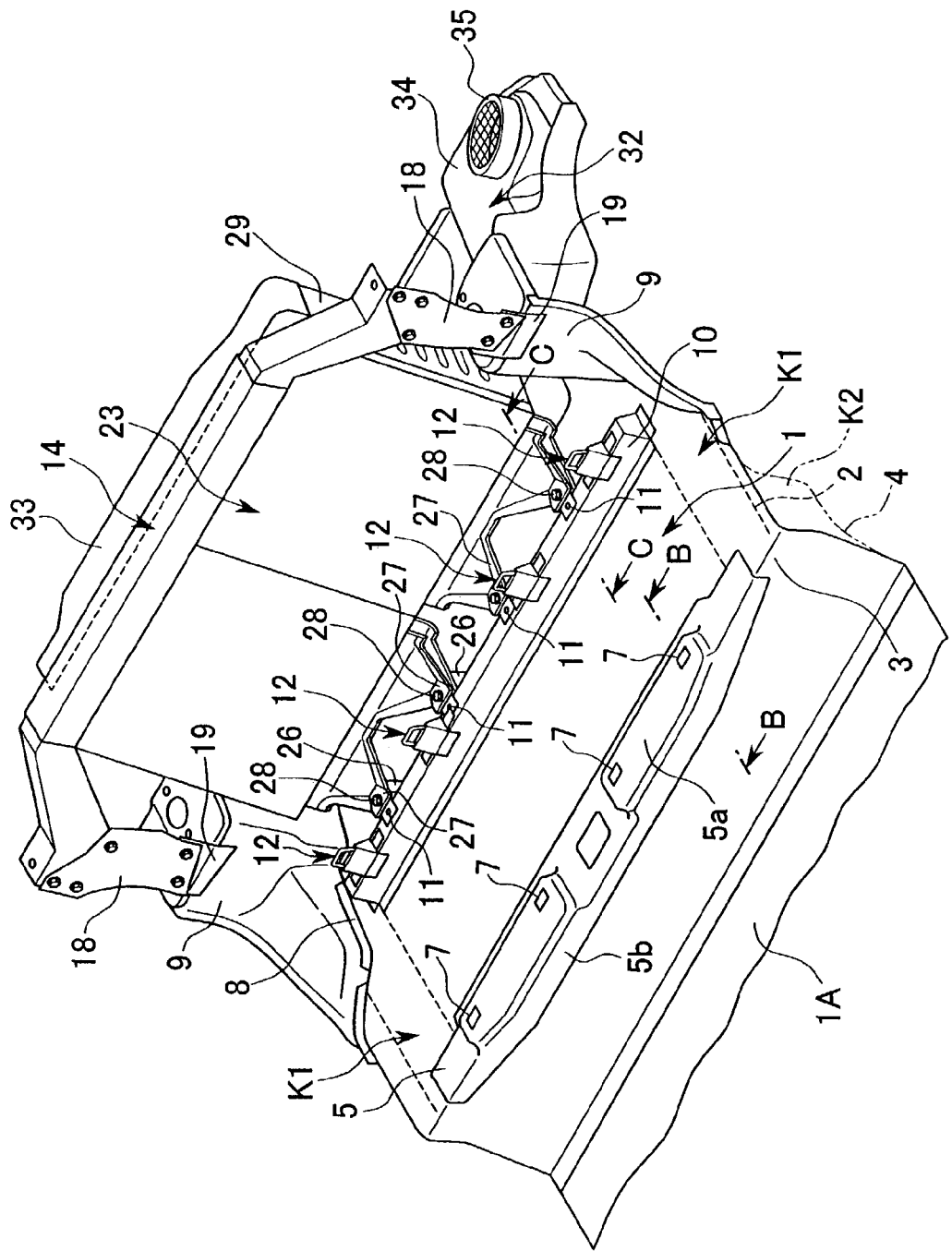
FIG. 9 is a perspective diagram showing the front view of seat fitting structure of the present invention.

As shown in FIGS. 8 and 9, inner panels 9 are joined by welding on both sides of the flange portion 8 of the rear floor 1 and the inner panel and the outer panel (not shown) form a wheel housing.

On the upper surface of the rear floor 1, a floor rear cross member 10 having a U-shaped cross-section (cross member at the rear side) is provided in the transverse direction of the vehicle so as to ride the rear frame 2. As shown in FIG. 7 in detail, the front flange 10a and the back flange 10b of the floor rear cross member 10 are welded to the floor 1 and the floor rear cross member 10 so as to form a structure having a closed cross-section which is naturally strong. Backside fixing holes 11 for fixing the backside 6A of the seat body 6 are provided at the upper wall of the floor rear cross member.

As shown in FIGS. 6 and 7, the rear seat body 6A of the rear seat 6 is fixed by inserting a bolt 13 through the front fixing hole of the rear seat 6 of the floor front cross member 5 and the backside fixing hole 11 of the rear seat 6 of the floor rear cross member 10 from the rear sides of the floor front cross member 5 and the floor rear cross member 10 and by clamping the bolt 13 by a nut 15 located at the side of the rear seat body 6A.

Note that, in the above case, fastening of the rear seat is carried out as shown above by inserting the bolt from rear sides of the floor front cross member 5 and the floor rear cross member 10 and by clamping the bolt using a nut disposed at the rear side of the rear seat, it is possible to fasten the rear seat using a nut at the rear side of the floor front cross member 5 and the floor rear cross member 10.

As shown in FIG. 6, the bottom of the rear sheet body 6A of the rear sheet 6 is formed by a thin flexible plate, and a recessed portion 6a is formed at the position above the front cross member 5, and the step 6b, forming the back side wall of the recessed portion 6a, attaches to the back wall 5d of the floor front cross member 5 so as to resist to the load applied to the rear sheet due to the slip of the rear sheet when the brake is operated. Note that the floor rear cross member 10 is provided with two pairs of lower anchors 12 for fixing child seats (not shown) to respective rear seats 6.

A rear pillar cross member 14 having a closed cross-section is provided in the transverse direction of the vehicle at the rear side of the rear seat 6, and one end portion of the rear pillar cross member 14 is joined to the inner panel 9 in the wheel housing through the bracket 18 and the reinforcing bracket plate 19 and end portions of the rear pillar cross member 14 are also joined to the inner panel of the rear fender panel through a supporting member (not shown). As shown in FIG. 8, at the back side of the rear pillar cross member 14, upper anchors for the child seats are provided at positions corresponding to the lower anchors 12, 12 for the child seats.

The upper fixing portion 24 of the capacitor 23 is fixed at the rear side of the rear pillar cross member 14 and the lower fixing portion 27 of the capacitor 23 is fixed by bolts 28 on the pedestal 26, which is joined to the back side of the floor rear cross member 10 and which is also fixed to the rear floor 1, so that the capacitor 23 is fixed in a standing but slightly tilted position wherein the upper portion of the capacitor 23 is tilted backward.

A hydrogen tank 36 (fuel tank) is provided under the rear floor 1, as shown in FIG. 6, and a fuel cell is provided under the front floor (not shown).

As described above, the rear seat body 6A of the rear seat 6 is joined by means of bolts 13 and nuts 15 to the floor front cross member 5 and to the floor rear cross member 10. Since it is not necessary to form a fitting hole in the rear floor 1 such that no counter measures are necessary to prevent exhaust gas from entering into the vehicle chamber, the present installation structure makes it possible to reduce the number of parts and to save assembly man-hours for assembly of the vehicle body. Furthermore, the present installation structure is capable of preventing the exhaust gas from entering into the vehicle chamber through the mounting holes of the rear seat. In addition, the present structure is also capable of improving the rigidity of the vehicle body since no mounting hole is formed in the floor plate and also due to the floor front cross member 5 and the rear floor cross member 10.

The floor front cross member 5 and the floor rear cross member 10 not only function for supporting the rear seat, but also function as the stop member to stop the shift of the seat by engaging the step portion 6b disposed at the front bottom side of the rear seat 6 with the backside wall 5d of the floor front cross member when the seat is shifted toward the front, so that the seat is reliably fixed at a position resisting to the shifting force toward the front by the driver. Since the floor front cross member 5 and the floor rear cross member 10 are connected to the framework K1 and are arranged along the framework K2 of the vehicle body, the rear seat 6 can be supported by the entire structure of the vehicle body.

As described above, installation of the seat by use of jointing tools to these cross members, which are connected to the floor, makes it possible not to bore holes though the floor of the vehicle, so that such installation prevents leakage of gas through the vehicle body. Consequently, it is the first effect that measures to prevent gas leakage through the floor of the vehicle are not required and the man-hours for vehicle assembly can be reduced.

Moreover, since the cross members function as a member to stop the shift of the seat by engaging the bottom portion at the front side of the rear seat with the back wall of the front cross member, a second effect is that the vehicle framework is quite stable against the forward load applied to the vehicle body when the vehicle is suddenly stopped.

What is claimed is:

1. An installation structure for a capacitor as a battery unit providing auxiliary electric power for a fuel cell in a hybrid vehicle, even in a vehicle having no luggage compartment, in a standing state, the installation structure comprising:

a rear pillar cross member mounted behind a rear seat in the transverse direction of the vehicle and both ends of which are connected to inner panels on both sides of a vehicle body through first brackets and to damper bases of wheel housing, which are fixed to and extend from the inner panels into a vehicle cabin, through second; and a floor cross member, mounted on the upper surface of a rear floor of the vehicle in the transverse direction of a vehicle body, wherein the top portion of the capacitor is joined to the rear pillar cross member and the bottom portion of the battery unit is joined to the floor cross member, wherein said floor cross member is positioned forwardly completely of said rear pillar cross member in a longitudinal direction of the vehicle.

* * * * *